United States Patent [19]

Yamazaki

[11] 4,404,624
[45] Sep. 13, 1983

[54] POWER CIRCUIT FOR ELECTRONIC TIMEPIECE

[75] Inventor: Suguru Yamazaki, Suwa, Japan

[73] Assignee: Kabushiki Kaisha Suwa Seikosha, Tokyo, Japan

[21] Appl. No.: 288,849

[22] Filed: Jul. 31, 1981

[30] Foreign Application Priority Data

Jul. 31, 1980 [JP] Japan ................................ 55-105309

[51] Int. Cl.³ ............................................ H02M 3/18
[52] U.S. Cl. ...................................... 363/59; 363/62; 368/204
[58] Field of Search .......................... 307/12, 15, 110; 363/59, 60, 62; 368/203, 204

[56] References Cited

U.S. PATENT DOCUMENTS

| | | | |
|---|---|---|---|
| 3,553,479 | 1/1971 | Nelson | 307/110 |
| 3,787,757 | 1/1974 | Sheng | 368/204 X |
| 3,999,368 | 12/1976 | Yoshida | 58/23 BA |
| 4,094,137 | 6/1978 | Morokawa | 58/23 A |
| 4,259,715 | 3/1981 | Monokawa | 363/60 |
| 4,290,100 | 9/1981 | Squires | 368/204 X |

Primary Examiner—William M. Shoop
Attorney, Agent, or Firm—Blum, Kaplan, Friedman, Silberman & Beran

[57] ABSTRACT

A power circuit for an electronic timepiece having a liquid crystal display includes a voltage regulation circuit, a voltage reduction circuit and a voltage booster circuit. In normal operation the voltage reduction circuit operates to drive the timekeeping circuits and extend battery life. When battery voltage drops due to heavy load, such as an alarm or lamp, the voltage regulation circuit and booster circuits operate to drive the timekeeping circuits and liquid crystal display respectively. The same transistors operate in the voltage reduction and booster circuits.

24 Claims, 6 Drawing Figures

POWER CIRCUIT FOR ELECTRONIC TIMEPIECE

BACKGROUND OF THE INVENTION

This invention relates generally to a power circuit for an electronic timepiece using a battery as a power source and more particularly, to a power circuit which extends battery life by voltage reduction during normal operation and improves display quality during periods of heavy load. Because the capacity per unit volume of a lithium battery is larger than the capacity of a silver oxide battery, a quartz crystal timepiece using a lithium battery can have a longer battery life. The lithium battery has a disadvantage in that a large voltage drop occurs when a large current is flowing from the battery because of the high internal impedance of the lithium battery. This occurs at such times as sounding of an alarm or lighting a lamp in the timepiece.

A lithium battery for a timepiece usually has a voltage of approximately three volts. An oscillator circuit and a divider circuit are driven with a power source supplying 1.5 volts which is obtained by reducing the battery voltage to $\frac{1}{2}$. The power source applying 1.5 volts is hereinafter referred to as $V_{SS\frac{1}{2}}$.

In order to prevent voltage applied to a circuit driven with the $V_{SS\frac{1}{2}}$ source from dropping below the voltage level which maintains oscillation in the oscillator circuit, power circuits have been devised which derive the $V_{SS\frac{1}{2}}$ source directly from the battery, or a voltage regulation circuit operates to supply $V_{SS\frac{1}{2}}$ with an output at the time of heavy load as when a lamp is lit or the like.

In conventional power circuits, although it is possible to prevent oscillation from stopping even when the battery voltage falls at the time of lighting a lamp of the like, there remains a disadvantage that lit segments in a multiplex driving liquid crystal display become darkened at the time of lighting of the lamp or the like. Such unsatisfactory performance becomes especially noticeable when the battery life is near its end or the ambient temperature is low.

What is needed is a power circuit for an electronic timepiece which conserves battery power during normal operation, and maintains timekeeping circuit performance as well as liquid crystal display quality when battery voltage is low.

SUMMARY OF THE INVENTION

Generally speaking, in accordance with the invention, a power circuit for an electronic timepiece having a liquid crystal display especially suitable for maintaining high performance during periods of low battery voltage is provided. The power circuit includes a voltage regulation circuit, a voltage reduction circuit and a voltage booster circuit. In normal operations, the voltage reduction circuit operates to drive the timekeeping circuits thereby extending battery life. When battery voltage drops due to a heavy current load such as an alarm or lamp being lit, the voltage regulation circuit and booster circuit operate to drive the timekeeping circuits and liquid crystal display respectively. Normal oscillations are maintained and the quality of the liquid crystal display is high. The same transistors operate in the voltage reduction and booster circuits. A lithium battery having both a high voltage and a high internal impedance is adapted for use in an electronic timepiece by means of the power circuit of this invention.

Accordingly, it is an object of this invention to provide an improved power circuit for an electronic timepiece which extends the battery life by operating the timekeeping circuits at reduced voltage during normal operation.

Another object of this invention is to provide an improved power circuit for an electronic timepiece which maintains the voltage for the oscillator circuit even when battery voltage is reduced due to high current load.

A further object of this invention is to provide an improved power circuit for an electronic timepiece which maintains a high quality of liquid crystal display even when battery voltage is reduced.

Still another object of this invention is to provide an improved power circuit for an electronic timepiece which utilizes the same integrated circuit components in a plurality of exclusively operating circuits.

Yet another object of this invention is to provide an improved power circuit for an electronic timepiece which compensates for the high internal impedance of a lithium battery.

Still other objects and advantages of the invention will in part be obvious and will in part be apparent from the specification.

The invention accordingly comprises the features of construction, combination of elements, and arrangements of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1A:
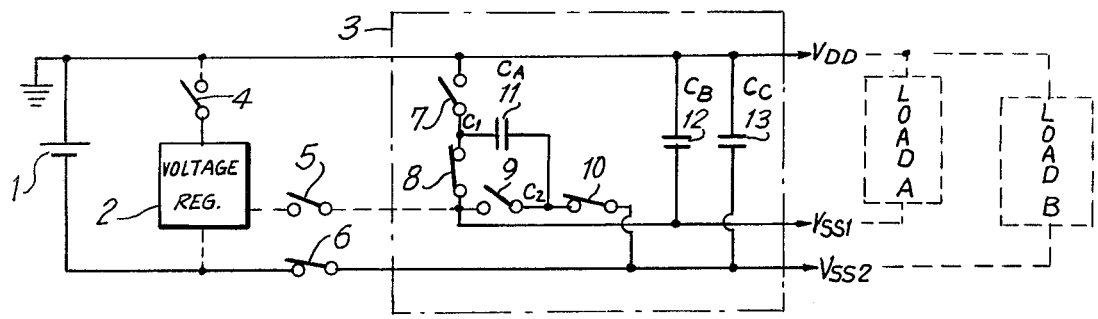
FIGS. 1a–d show a functional power circuit for an electronic timepiece in accordance with this invention in various operating states.

The power circuit in accordance with this invention is for an electronic timepiece or the like, which uses as a power source a battery having a high internal impedance, for example, a lithium battery. The power circuit in accordance with this invention furnishes a stable voltage to an oscillator circuit, a divider circuit, a logic circuit such as a counter, an alarm and chronograph, and to a driver circuit for a liquid crystal display even when a heavy load circuit such as an illuminating lamp or a buzzer in the timepiece is driven. Under such heavy load condition, the output voltage of the power source is reduced. The power circuit in accordance with this invention also reduces power consumption under normal load operating conditions. The above-mentioned functions are accomplished using semi-conductor integrated circuitry.

In a conventional quartz crystal timepiece using a lithium battery having a voltage of about 3.0 volts, a voltage of approximately 1.5 volts is produced by a $\frac{1}{2}$ voltage reduction circuit comprising switching transistors and capacitors. The 1.5 volts is supplied to drive the oscillator and divider circuits, and a logic circuit such as a counteralarm and chronograph. Operation at the lower voltage level is used to reduce power consumption and extend the life duration of the battery.

When using a multiplex driven liquid crystal display, which is driven at V−2V with a duty cycle ½, the reduced voltage of 1.5 volts becomes the voltage V of a signal for driving the liquid crystal display and the battery voltage itself from the lithium battery is supplied as the signal 2V for driving the liquid crystal. In the multiplex driven liquid crystal display which is driven at V−2V, the level V is applied to non-lit portions of the display and the level 2V is applied to the lit portions in the known manner. Hereinafter, such a display is referred to as V−2V liquid crystal display. U.S. Pat. Nos. 3,896,430 and 3,903,518 describe such a V−2V display and accordingly, no further description is provided herein.

Because the internal impedance of a lithium battery is high, the voltage of the battery may fall to less than 2.0 volts under heavy load conditions when a large current is flowing, for example, when a lamp is lit or when an alarm buzzer is sounded. If the battery voltage is reduced in normal operation from 3.0 volts to 1.5 volts, only 1.0 volts or less is obtained through that reduction circuit under heavy load although 1.5 volts is required for stable operation of the timekeeping circuit.

Thus, the quartz crystal oscillator may stop oscillating and the liquid crystal display can be become inferior in contrast. Stoppage of the oscillator is a fatal disadvantage for a timepiece. Therefore, in order to prevent stoppage of oscillation of the quartz crystal oscillator, circuits have been devised whereby the voltage reduction circuit is disconnected from the circuit normally driven at 1.5 volts and the battery voltage of the lithium battery is supplied directly to that circuit which normally requires 1.5 volts. Alternatively, a voltage of 1.5 volts produced by a voltage regulation circuit operating on the battery is supplied to the circuit which is normally to be driven at 1.5 volts. However, these circuits do not compensate for the other disadvantage, that is, the contrast of the liquid crystal display deteriorates when the battery voltage drops under heavy load conditions.

The power circuit for an electronic timepiece in accordance with this invention eliminates the disadvantages described above of earlier power circuits when a lithium battery is used. Operation of the power circuit in accordance with this invention is now described in relationship with a V−2V liquid crystal display timepiece.

When current consumption is low and the battery voltage is only very slightly reduced, the voltage for a circuit to be driven at 1.5 volts is obtained by reducing the battery voltage to ½ while at the same time the battery voltage itself is used as the 2V voltage for driving the V−2V liquid crystal display.

When the battery voltage is reduced under heavy load, a stable voltage of 1.5 volts is obtained by operating a voltage regulation circuit to drive the oscillator, divider circuits and a logic circuit such as a counter, alarm and chronograph and to provide the V-voltage for driving the V−2V liquid crystal display. Also, the stable voltage of 1.5 volts from the voltage regulation circuit is then boosted to 3.0 volts by a voltage doubler circuit and the 3.0 volt signal is supplied as the 2V-voltage for driving the V−2V liquid crystal display. Briefly stated, these are the modes of operation of the power circuit for an electronic timepiece in accordance with this invention.

A circuit construction based on the above-described operation, and greater details of operation are now explained with reference to FIGS. 1a through 1d. The circuit includes a battery 1 and a voltage regulation circuit 2 which outputs a stable voltage when operating. The circuit portion, 3, surrounded by broken lines, serves as either a voltage booster or a voltage reduction circuit as explained more fully hereinafter. $V_{DD}$ is the ground level of the power source and $V_{SS1}$ and $V_{SS2}$ respectively represent power source outputs supplying −1.5 volts and −3.0 volts during normal operation.

Obviously, the loads A requiring 1.5 volts are connected across the terminals $V_{DD}$–$V_{SS'}$. Such loads, indicated with broken lines in FIG. 1a, would include the normally functioning oscillator and divider circuits. The loads B requiring 3.0 volts are connected across the terminals $V_{DD}$–$V_{SS2}$. Such a load, indicated with broken lines in FIG. 1a, includes the circuit for providing the 2V voltage for the V−2V display driving circuit. As stated above the V−2V driving circuit uses both inputs, that is, the two voltage outputs $V_{SS1}$, $V_{SS2}$.

A lamp or an alarm, for examples, which operate intermittently and represent heavy loads are connected by means of a switching circuit directly across the battery 1 such that the heavy currents do not flow through the regulation, reduction and booster circuits.

Figure 1B:
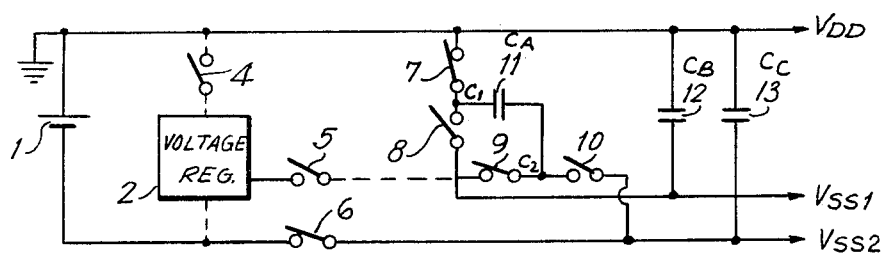

FIGS. 1a and 1b show the condition of the power circuit during operation at normal load. The voltage regulation circuit 2 is cut-off from the battery 1 and the remainder of the circuit by means of a switch 4 and there is no power consumption by the voltage regulation circuit 2. The output terminal of the voltage regulation circuit 2 is isolated for the remainder of the circuit by a switch 5 which is open while at the same time a switch 6 is closed and conducting. Thus, voltage of the battery 1 is directly supplied to the circuit load B which is to be driven with a voltage $V_{SS2}$, that is, in this example, −3.0 volts. The circuit also includes four switches 7–10 and capacitors 11–13. In FIG. 1a, the switches 8,10 are closed and conducting and the capacitors 11 ($C_A$), 12 ($C_B$) are connected in series across the battery 1. Thereby, these capacitors are charged by the battery 1. The capacitor 13 is also across the battery 1 and charged.

On the other hand, in FIG. 1b, the switches 7,9 are closed and conducting and the capacitors 11,12 are connected in parallel. As a result, the smoothing capacitor 12, which smooths the voltage circuits A to be driven at the level $V_{SS1}$, is backed up with the stored potential in the capacitor 11. The switches 8,10 are always ON when the switches 7,9 are OFF and vice versa. The switches cooperatively cycle on and off continuously. When the capacity of the capacitor 11 is equal to that of the capacitor 12 ($C_A$, $C_B$ respectively), the voltage at $V_{SS1}$ is reduced to ½ of the voltage of the battery 1.

Figure 1C:
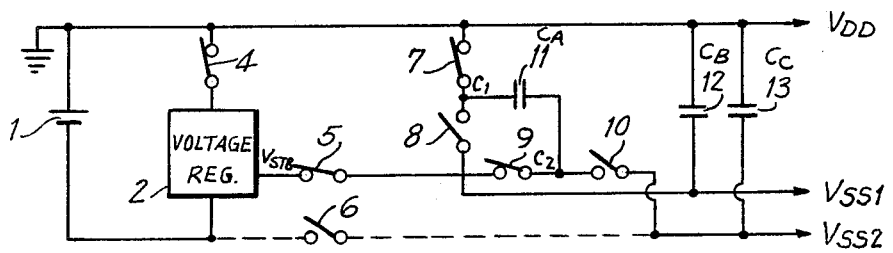
Figure 1D:
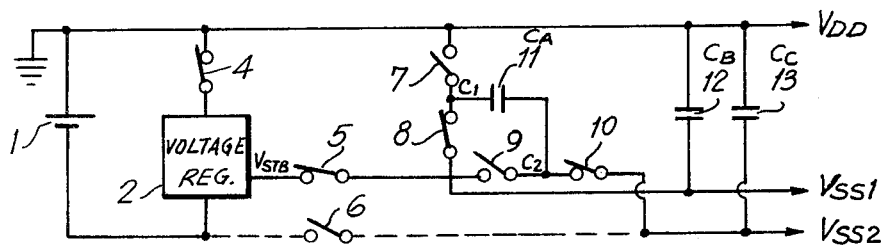

FIGS. 1c and 1d show the power circuit operating under a heavy load which has caused a drop in the voltage level output from the battery 1. The switch 4 is closed to drive the voltage regulation circuit 2 with the battery voltage and a stabilized voltage $V_{STB}$ of approximately 1.5 volts is available at the output terminal of the voltage regulation circuit 2. The switch 5 is closed so that the voltage at the level $V_{STB}$ is supplied directly to the terminal $V_{SS1}$ and the circuits A driven therefrom. The switch 6 is open so that the voltage of the battery 1 is disconnected from the circuit which is normally driven from the supply $V_{SS2}$. Detection of the lower voltage of the battery 1 operates circuits for changing the condition of the switches 4,5,6 as described.

FIG. 1c shows a state where switches 7,9 are closed so that the stable voltage $V_{STB}$ is charged into the capacitor 11. The capacitor 12 is also charged by the output $V_{STB}$. FIG. 1d shows the state where the switches 8,10 are closed so that potential is supplied from the capacitor 11 to the smoothing capacitor 13 for the circuits B to be driven at the level $V_{SS2}$. That is, when the switches 8,10 are closed (FIG. 1d) the capacitors 11,12 and their stored potentials are in series between the lines $V_{DD}$ and $V_{SS2}$ and in parallel with the capacitor 13. In this way, as the switches 7,9 and the switches 8,10 cooperatively cycle ON and OFF continuously as described above, the circuit to be driven at the level $V_{SS2}$ is supplied with a voltage which is twice the voltage $V_{STB}$, which level is supplied to the circuit driven at the level $V_{SS1}$. This boosting operation is similar to the method used in boosting the battery voltage of a silver oxide battery. Thus, two levels of voltage are maintained under both high and low load conditions and a load such as the driving circuit for a V−2V display which relies on both levels, is always operated with a high quality output.

From the description above, it is apparent that both the voltage reduction operation and the boosting operation can be performed by the same switching transistors when such transistors replace the switches shown in FIGS. 1a-d. Thus, it is simple to apply this invention to an integrated circuit.

Figure 2:
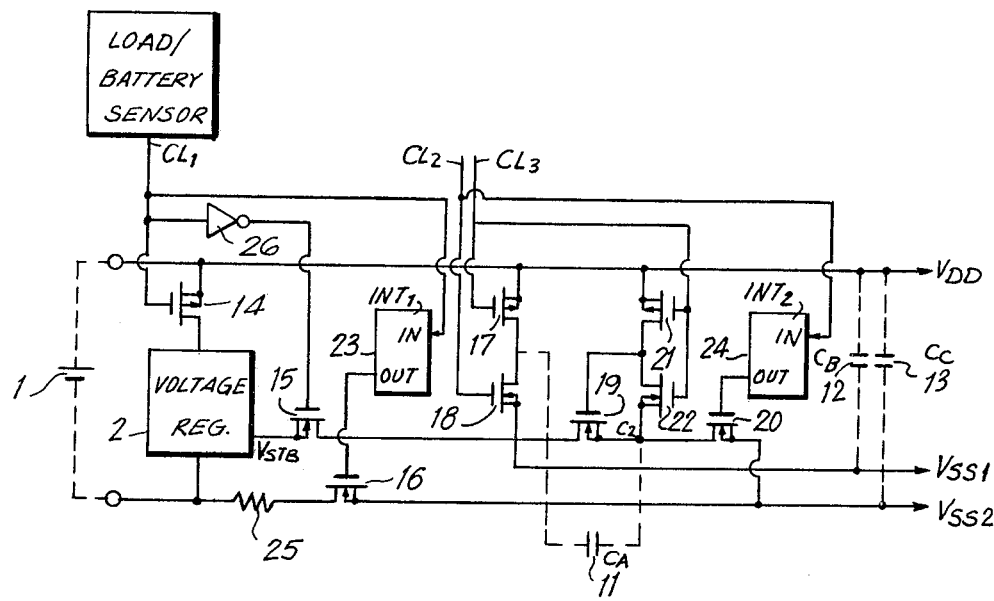
FIG. 2 is a detailed circuit diagram of the functional circuit of FIG. 1.

FIG. 2 is a detailed schematic diagram of an integrated circuit embodying the functional circuits of FIGS. 1a-d. When a control signal $CL_1$ is high, the voltage of the battery 1 is directly applied to a circuit load (as in FIG. 1a) to be driven with a voltage level $V_{SS2}$. When the signal $CL_1$ is low, the voltage regulation circuit 2 operates to supply a stable voltage to the circuit to be driven at the level $V_{SS1}$. A binary signal generator which senses battery voltage and outputs a high or low signal ($CL_1$) depending on the battery voltage level, is known in the art and is accordingly given no detailed description herein.

Figure 3:
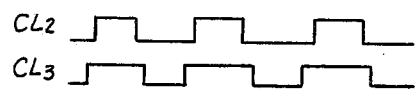
FIG. 3 is a timing chart for clock signals in the circuit of FIG. 2.

Switching transistors 14-20 respectively correspond to the switches 4-10 of FIGS. 1a-d. Clock signals $CL_2$ and $CL_3$ control the ON or OFF state of the switching transistors 17,20 in the circuit which serves both as a booster or voltage reducer, and the timing of these clock signals is shown in FIG. 3. These signals usually have a frequency in the order of 256 to 2,000 Hz and are derived from the oscillator/divider circuits, for example.

The transistors 21,22 adjust the voltage amplification of the signal $CL_3$ to that at the point $C_2$. The circuit also includes level shifters 23,24, that is, level shifters $INT_1$ and $INT_2$ respectively. The level shifter 23 shifts the signal $CL_1$ from a voltage amplification of battery voltage to that of a circuit to be driven at the level $V_{SS2}$. The level shifter 24 shifts the signal $CL_2$ from a voltage amplification of a circuit to be driven at the level $V_{SS1}$ to that of a circuit to be driven at a level $V_{SS2}$. A protector resistor 25 prevents erroneous operation of the logic circuitry in the timepiece resulting from rapid change in voltage of the battery 1. The capacitors 11-13, that is, capacitors $C_A$, $C_B$ and $C_C$ are external components connected to a semi-conductor integrated circuit with the connection of all non-integrated components being shown with broken lines. Using the same switching transistors in the booster and reduction circuits saves space on the integrated circuit.

With respect to the capacitors $C_B$ and $C_C$, from a normal point of view, the capacitor $C_C$ is unnecessary when the capacitor $C_B$ is required, that is, when voltage reduction is performed under normal load conditions. On the other hand, the capacitor $C_B$ is unnecessary when the capacitor $C_C$ is required, that is, when the voltage boosting operation is performed under heavy load. From this viewpoint, it can be considered that only one of the capacitors, either $C_B$ or $C_C$ would be used to selectively connect to the circuit to be driven at the level $V_{SS2}$ at the time of voltage boosting or to the circuit to be driven at the level $V_{SS1}$ at the time of voltage reduction. However, in practice, in the transitional period from the boosting operation to the voltage reduction operation, the voltage level supplied to the circuit to be driven with the level $V_{SS1}$ shows an unwanted variation. Thereby, an error is caused in operation of the logic circuits. Thus, three external capacitors $C_A$, $C_B$, and $C_C$ are required as independent components for best performance.

In a power circuit in accordance with this invention, power consumption under normal load is made small because the voltage regulation circuit is operated only at the time of heavy current load. Also, the voltage regulation circuit is easy to design as compared with a power circuit wherein the voltage regulation circuit is always operating, because the voltage regulation circuit itself, in accordance with this invention, may be allowed to consume much power for the sake of simple construction because it is adapted to produce the required regulated voltage only when the battery voltage is reduced. Moreover, the disadvantage described above in earlier power circuits, in that the contrast of the display becomes deteriorated under heavy load, is eliminated.

The embodiment described above is relevant to a power circuit in accordance with this invention adapted to a quartz crystal timpiece having a liquid crystal display driven with a V−2V system. The power circuit in accordance with this invention is also applicable to a power circuit for a quartz crystal timepiece in which a multiplex driving liquid crystal display is driven at V−2V−3V and with a duty cycle of $\frac{1}{3}$ or with a higher degree of duty cycle.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A power circuit for an electronic timepiece, said timepiece being a variable load on said power circuit, comprising:

a power supply having a high internal impedance, the output voltage of said power supply being diminished under heavy load;

a voltage booster and reduction circuit for increasing the voltage above the power supply voltage in a first mode of operation, and for reducing the voltage below the power supply voltage in a second mode of operation;
a voltage regulation circuit for providing a stable output voltage;
switching means for selectively engaging with said power supply one of said voltage booster and reduction circuit operating in said second mode and a combination of said voltage regulation circuit and said voltage booster and reduction circuit operating in said first mode;
means for generating a signal in response to the level of said output voltage of said power supply, said signal activating said switching means,
said power circuit operating automatically in one or two operating conditions in response to the power supply voltage magnitude.

2. The power circuit as claimed in claim 1, wherein said variable load is comprised of a normal continuous load and an intermittent load, said intermittent load, when operating, drawing a heavy current and causing said power supply output level to drop.

3. The power circuit as claimed in claim 2, wherein said switching means is adapted to select said voltage booster and reduction circuit operating in said second mode for normal operation of said continuous load, and said regulation circuit and booster and reduction circuit operating in said first mode for concurrent operation of said continuous load and said intermittent load.

4. The power circuit as claimed in claim 1 or 3, wherein said power circuit further comprises two output terminals, the voltage level available at each said terminal being different.

5. The power circuit as claimed in claim 4, wherein the first said terminal outputs a voltage from said booster and reduction circuit operating in said second mode under normal load and from said regulation circuit under heavy load.

6. The power circuit as claimed in claim 5, wherein said second terminal outputs said power supply voltage at normal load and a voltage from said booster and reduction circuit operating in said first mode at heavy load.

7. The power circuit as claimed in claim 3, wherein said booster and reduction circuit includes switches, said switches being common to both operating modes.

8. The power circuit as claimed in claim 7, wherein said switches are transistorized.

9. The power circuit as claimed in claim 3, wherein said booster and reduction circuit includes three capacitors.

10. The power circuit as claimed in claim 9, and further including switches, said switches being adapted to connect two of said capacitors alternately in series and parallel across said power supply for voltage reduction, and alternately from parallel to series across said regulation circuit for voltage boosting.

11. The power circuit as claimed in claim 1, 3, 7 or 10, wherein said power circuit is formed at least in part as an integrated circuit.

12. The power circuit as claimed in claim 11, wherein said regulation and booster and reduction circuits and said switching means are integrated circuits, said switch means including transistorized switches.

13. The power circuit as claimed in claim 1 or 3, and further comprising a resistor in series with said power supply an said load, said resistor being adapted to prevent faulty timepiece operation caused by sudden changes in said power supply voltage.

14. The power circuit as claimed in claim 1, 3, 7 or 10, wherein said power supply is a battery.

15. The power circuit as claimed in claim 14, wherein said battery is a lithium battery.

16. The power circuit as claimed in claim 3, wherein said continuous load includes the timekeeping functions of said timepiece.

17. The power circuit as claimed in claim 6, wherein said second terminal is adapted to apply a voltage for driving a liquid crystal display.

18. The power circuit as claimed in claim 17, wherein said liquid crystal display is driven with a multiplex driving system.

19. A power circuit for an electronic timepiece, said timepiece being a variable load on said power circuit, comprising:
a power supply having an output voltage subject to change;
a voltage booster and reduction circuit for increasing the voltage above the power supply voltage in a first mode of operation, and for reducing the voltage below the power supply voltage in a second mode of operation;
switching means for selectively engaging with said power supply one of said voltage booster and reduction circuit operating in said second mode and a combination of said voltage regulation circuit and said voltage booster and reduction circuit operating in said first mode;
means for generating a signal to activate said switching means,
said power circuit operating in one of two operating conditions in response to said signal from said switching means.

20. A power circuit as claimed in claim 19, wherein said booster and reduction circuit includes switching transistors, said switching transistors being used in common in both operating modes.

21. A power circuit as claimed in claim 19, and further comprising a protective resistor between said power supply and said load so as to prevent an error action in said timepiece caused by the rapid change of power supply voltage.

22. A power circuit as claimed in claim 19, wherein three capacitors are used in said booster circuit reduction circuit to smooth load voltages when switching between said two modes.

23. A power circuit as claimed in claim 19, wherein said power supply is a battery.

24. A power circuit as claimed in claim 19 or 23, wherein said means for generating a signal outputs said signal in response to changes in the voltage of said power supply.

* * * * *